United States Patent [19]

Carr et al.

[11] Patent Number: 5,243,696
[45] Date of Patent: Sep. 7, 1993

[54] PROGRAMMABLE ELECTRONIC DISPLAY FOR A CHART RECORDER

[75] Inventors: Daniel J. Carr, Harleysville; Charles R. Scally, Warminister; Michael D. Carney, Havertown; Scott L. Kern, Perkasie; Thomas A. Satko, Ivyland; James W. Zecca, Telford, all of Pa.

[73] Assignee: General Signal Corporation, Stamford, Conn.

[21] Appl. No.: 804,475

[22] Filed: Dec. 9, 1991

Related U.S. Application Data

[63] Continuation of Ser. No. 459,080, Dec. 29, 1989, abandoned.

[51] Int. Cl.[5] .................................... G06F 15/62
[52] U.S. Cl. ........................ 395/155; 364/413.06; 364/481; 364/487
[58] Field of Search .............. 364/413.06, 481, 487; 395/154-155

[56] References Cited

U.S. PATENT DOCUMENTS

| | | | |
|---|---|---|---|
| 4,316,249 | 2/1982 | Gallant et al. | 364/413.06 |
| 4,433,338 | 2/1984 | Nakagawa et al. | 346/34 |
| 4,586,036 | 4/1986 | Thomason et al. | 340/720 |
| 4,654,672 | 3/1987 | Kimura et al. | 346/46 |
| 4,873,623 | 10/1989 | Lane et al. | 364/188 |

Primary Examiner—Gary V. Harkcom
Assistant Examiner—Almis Jankus
Attorney, Agent, or Firm—John F. Ohlandt; Raymond E. Smiley

[57] ABSTRACT

A multipoint, multiple function recorder which can record, display, and process up to 135 input/output data points, either analog or discrete, in various combinations. A strip chart recorder is provided for permanently recording input and output data points and, in conjunction with the chart recorder, a separate programmable dot matrix display is provided, such display being responsive to the same input/output data points and operable for displaying data in both alphanumeric and graphic form, the display being independently operable from said chart recorder, such that said input/output points are displayable at different times from the times when they are being printed on the chart recorder.

5 Claims, 6 Drawing Sheets

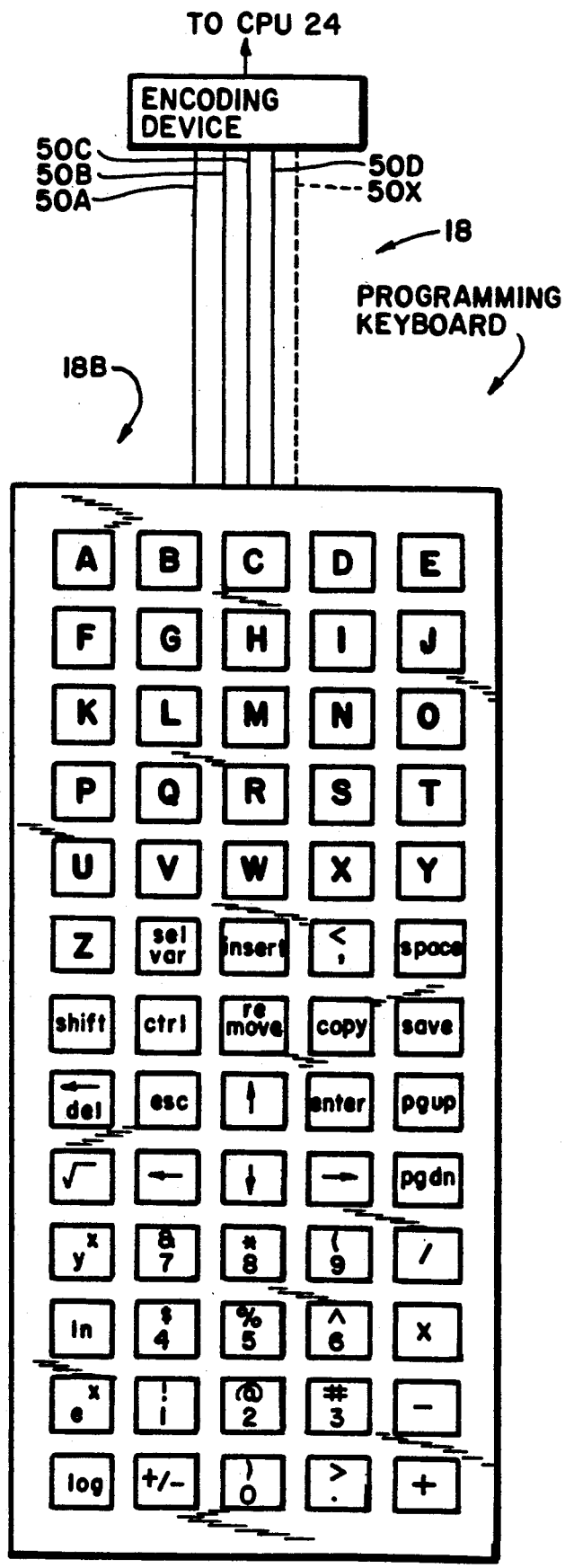

FIG.5B

FORMAT 1-ANALOG POINT

| TAG-001 | TAG-102 TAG-103 TAG-104 5 MORE GROUP 2 AOOP |
|---|---|
| TAG-208 | SOAK ZONE TEMP 2380.5      DEGR F |
| ZOOM | 10    14    18    22    26    30  X100 |

FIG.5C

FORMAT 2-ANALOG POINT

| TAG-208 | | DEGR F AOOP |
|---|---|---|
| HOLD | SOAK ZONE TEMP 2380.5 | X100 |
| | 10   14   18   22 ▽  26   30 | |

FIG.5D

FORMAT 7-ANALOG POINT

| GROUP 2 | | ↗ AOOP |
|---|---|---|
| | A1107    123399    GALLON | |
| | 0   40   80   120   160   200 | X1000 |

FIG.5E

FORMAT 8-ANALOG POINTS

| A12 | 3.7666 | A13 | 1234.5 | A14 | 1234.5 | GROUP 2 | AOOP |
|---|---|---|---|---|---|---|---|
| A123 | 23.888 | PP44 | 345.21 | CN50 | 35.000 | PP3 | 234.33 |
| A1112 | 333.22 | A1105 | 26.250 | A134 | 999.23 | PP60 | 293832 |
| A1107 | 1.4958 | A19 | 99.321 | A122 | 226.88 | A188 | 345.22 |

PROGRAMMABLE ELECTRONIC DISPLAY FOR A CHART RECORDER

This application is a continuation of application Ser. No. 07/459,080 filed Dec. 29, 1989 now abandoned.

The present invention relates to an apparatus and system for recording and displaying input/output data points; more particularly, to the combination of (1) a separately programmable dot matrix display with (2) a strip chart, multiplecolor recording device for recording on a sheet of recording paper the magnitudes of a plurality of varying analog signals as a pattern of dots in different colors.

BACKGROUND OF THE INVENTION

Recording apparatus of the automatic balancing type for striking dots on a fanfold chart have heretofore been widely used to record the magnitudes of a plurality of analog input signals. An example of a multiple-color recording apparatus of this type which records on a sheet of recording paper the various analog signals as a pattern of dots and also records characters, symbols, and the like relating to the analog recording as a pattern of dots of desired colors, is known from U.S. Pat. No. 4,433,338, issued Feb. 21, 1984. Likewise, similar apparatus is known from U.S. Pat. No. 4,654,672. In the former patent there is shown a display unit forming part of a panel P which also includes a keyboard. As will be appreciated from that patent, a limited number of display elements are available for displaying date, hour, range, and alarm settings, as well as a number of switches for setting various parameters and for setting recording modes and the like.

SUMMARY OF THE INVENTION

Although it has been known, as indicated, to have a multiple-color recording apparatus providing a facility for recording data on a sheet of recording paper and to provide some form of display, what has been lacking is a full-blown display device operable in conjunction with a chart recorder. By full-blown is meant a display apparatus capable of displaying a variety of input/output points and for establishing in one presentation on a dot matrix screen or the like all of the configurations for those various input/output data points.

Accordingly it is a primary object of the present invention to provide a system for recording and displaying input/output data points in either analog or discrete form comprising: a chart recorder for recording said input/output date points; a separate programmable dot matrix display responsive to said input/output data points, said display being operable independently of said chart recorder such that said input/output points are displayable at different times from the times when they are being printed on said chart recorder; and means for selecting the presentation of said data in graphic form on the display in a variety of formats.

It should be especially noted that the operation of the display in accordance with the present invention is totally independent of chart operation in the sense that the display is capable of displaying data in a number of formats without any influence on chart activities which are occurring simultaneously. It is also important to note that data may be displayed a single point at a time or several points at a time; or as many as fifteen input/output points can be viewed on the display simultaneously. On the other hand, multiple points or groups of points may be displayed sequentially, with each point or several points displayed for a short period of time and then followed by the next. The way in which this is accomplished will be explained hereinafter.

There are also a number of individual specific features of the present invention:

A zoom feature is provided which enables magnifying the scale which appears on the display as well as on the strip chart recorder.

Another specific feature relates to the particular analog displays that are enabled by the present invention, more specifically, a scaled bar graph and, associated therewith, a large or small pointer display to indicate current values of parameters such as temperature, pressure, etc. Moreover, means are provided for having a trend indicator in the form of a special rotatable arrow on the display; for example, for indicating a trend in a particular direction such as sharply upward for temperature or the like.

Other and further objects, advantages and features of the present invention will be understood by reference to the following specification in conjunction with the annexed drawing, wherein like parts have been given like numbers.

BRIEF DESCRIPTION OF THE DRAWING

FIG. 4 depicts the interrelationship between the hand-held keyboard for programming or configuring purposes and the CPU.

FIG. 5B is an example of what is called Format 1—Analog Point, involving a display featuring information as to a line, and including a single point descriptor ID, and having a scale with bar graph.

FIGS. 5C, 5D, and 5E illustrate other exemplary formats for the display of the present invention.

DESCRIPTION OF PREFERRED EMBODIMENT

Figure 1:
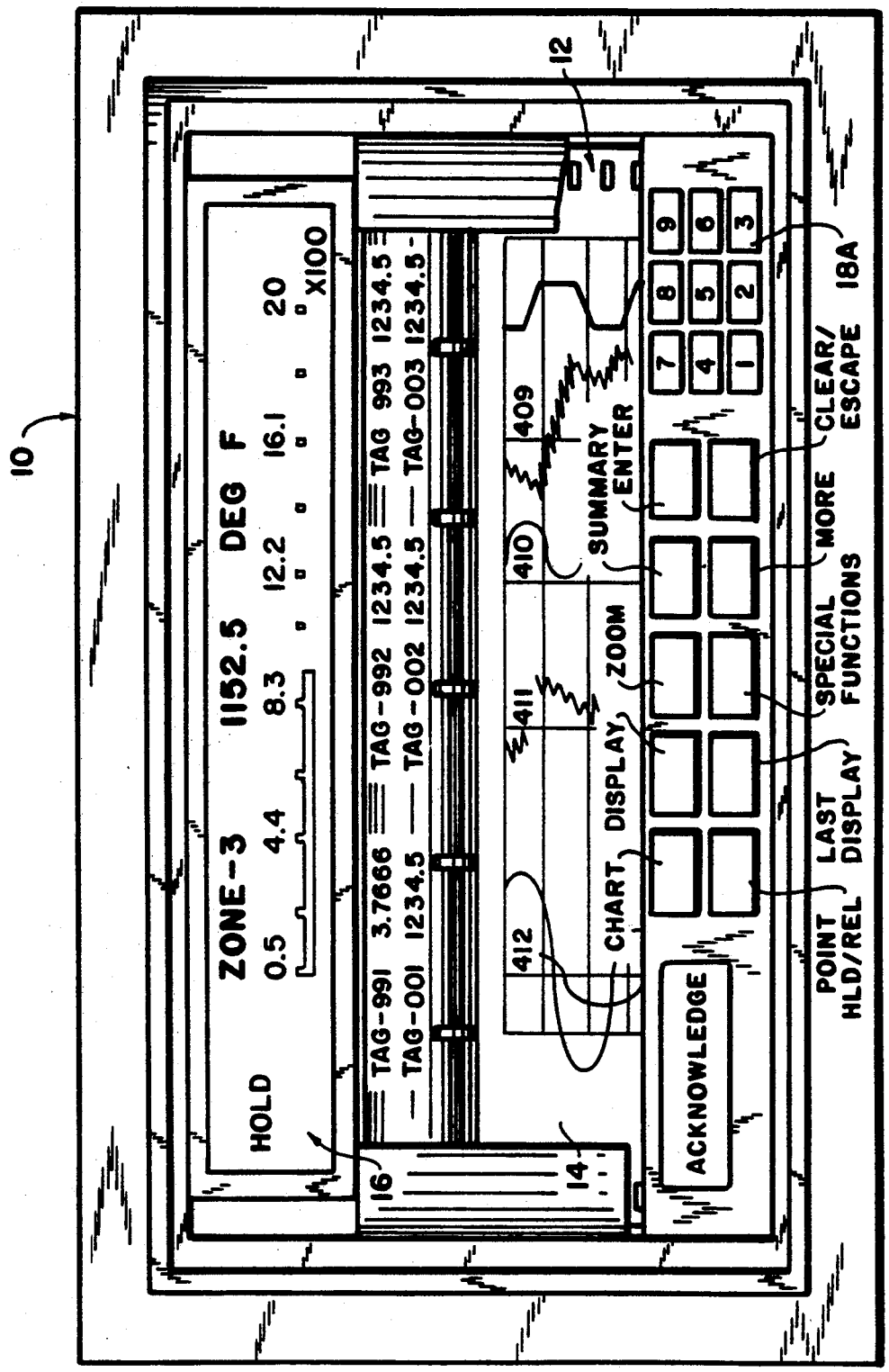
FIG. 1 is a perspective view of the recorder of the present invention, particularly showing the chart recorder, display, and controls therefor.

Referring now to the figures of the drawing, and initially to FIG. 1 thereof, there will be seen the multipoint, multiple function recorder 10 which can record, display, and process up to 135 input/output data points, either analog or discrete, in various combinations. Recorder 10 comprises a strip chart recorder device 12 which utilizes a four-color impact print mechanism (not seen) and fanfold paper 14. The chart is illuminated by an internal fluorescent lamp for improved visibility and has an automatic chart advance feature for continued monitoring of the most recently printed trend data.

At the upper part of the front of the unit is seen a high visibility graphic dot matrix display 16. This display features a double size enhanced character mode for easy view of individual point data from a distance. As will be explained, operation of the display is independent of the printer and is fully under operator control from a front panel operating keyboard 18A or from programming keyboard 18B.

It is to be noted that details of the data handling ability of the system in accordance with the present invention, as well as the alarms, programming security, and diagnostics capabilities may be appreciated by reference to Operator's Manual #277800, revision B, by Leeds and Northrup, which is incorporated into this specification by reference. It suffices to note here that the system of the present invention can handle a variety of input signals, whether they be analog or discrete type, and that input or output data can be either printed or viewed on the display. Furthermore, data may also be used in calculations using special formulas which are resident in the system.

It is thought useful here to provide a series of definitions of certain terms which will be used throughout the specification; by the term "parameter" is meant an input, an output, any data point or combination of data points, or a combination of calculated values. The term "sensor" includes not only what is conventionally thought of as a sensor, but also an individual alarm which can be configured to be activated by virtually any desired parameter.

In the case of an alarm operation, an alarm triggers a discrete output (DO). Alarm status can be monitored individually or in summary form. Furthermore, alarms can be displayed as will be explained and, of course, they can be printed on occurrence and when cleared.

As selected by the user, alarms can be reported on the chart and on the display with descriptive information, alarm information including parameter ID and value, alarm limit and reference I/O descriptions. Events, open inputs, and diagnostic messages can be similarly reported. With reference to programming, the system of the present invention can be fully configured or programmed and ready to operate with factory set values for all purposes and functions. The factory set arrangement is the "default" configuration. What this means is that if the user does not enter a different value or values, the factory set items will apply, by "default". It is intended that this default configuration be modified by the user to suit the application.

Figure 2:
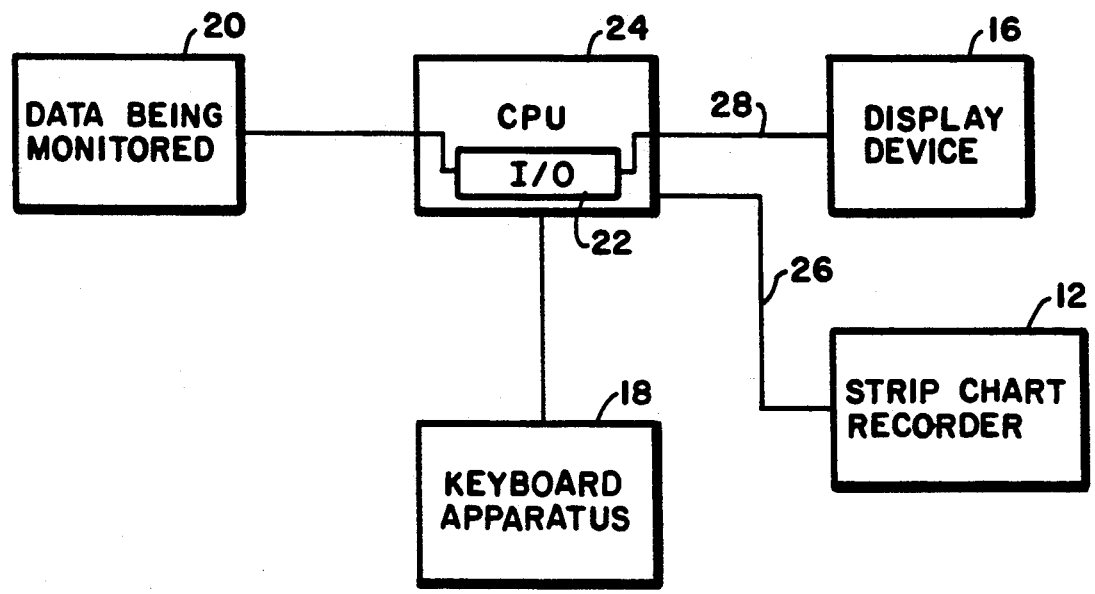
FIG. 2 is a block diagram of the system of the present invention in accordance with one embodiment, in particular, depicting the interrelationship between the data being monitored and the microprocessor or CPU control system, as well as the display, chart recorder, and the keyboard apparatus which includes both an operating keyboard and a programming keyboard.

It will be appreciated that programming is accomplished by means of another specialized hand-held keyboard forming part of keyboard apparatus 18 seen in FIG. 2. This keyboard is designated 18B in FIG. 4. A receptacle, not seen, on the recorder depicted in FIG. 1 is provided for accepting the keyboard 18B.

It is to be noted that programming operations are fully menu driven, with screen prompts to guide each step. Moreover, a "copy" function reduces the need for repetitive keyboard work during data entry. Configuration data is stored in battery backed-up RAM forming part of the CPU 24 seen in FIG. 2.

Turning now to FIG. 2, several of the components seen in block form have already been noted, namely the keyboard 18 and CPU 24. Additionally, the block 20 indicates in general the various data input points being monitored, whereas block 22 represents the conventional input/output interface.

Connected to the CPU 24 by connection 26 is the strip chart recorder previously noted as the recorder device 12. The display 16 is shown likewise connected by suitable connection 28 to the CPU 24.

Referring again to the operating keyboard 18A, the particular keys will be appreciated by referring to 1. The first key to be noted is the CHART key, at the left in the upper row of two rows of five keys each. This key controls the operation of the chart. Pressing the chart key permits a number of menu selections, as seen; in particular, two chart speed selections may be determined by programming and each may be set to a value between 1 and 200 centimeters per hour in one centimeter per hour increments.

The next key, the DISPLAY key to the right of the CHART key, is used to present data on the dot matrix display 16 for review by the operator. This is accomplished by means of one of the connections 30A-30X extending from the operator keyboard 18A to a conventional encoding means 40, which can form part of the CPU 24, serving to translate the depression of the key to a suitable coded signal, thereby effectuating a stored program to produce the desired result.

When the DISPLAY key has been depressed, the data will be shown on the screen in sequential fashion, with each data point or group of points displayed for a few seconds and then followed by the next point or group. When the DISPLAY key has been depressed, the menu selections seen are offered. It will be understood that the numerals here refer to the numbered keys on the right of the keyboard 18A depicted in FIGS. 1 and 3.

The details of the select display operation, that is, what happens when individual selection is made of the different menus or formats, will be covered in the latter portions of the specification.

Another feature that should be noted is one operated by the ZOOM key seen to the right of the display key in FIG. 1. This key is used to magnify the scale of points being trended for better visibility. Such key operates over one of the connections 30A-30X and thence by way of the encoding means 40 to affect the CPU 24 to cause activation of the appropriate program contained therein.

Figure 3A:
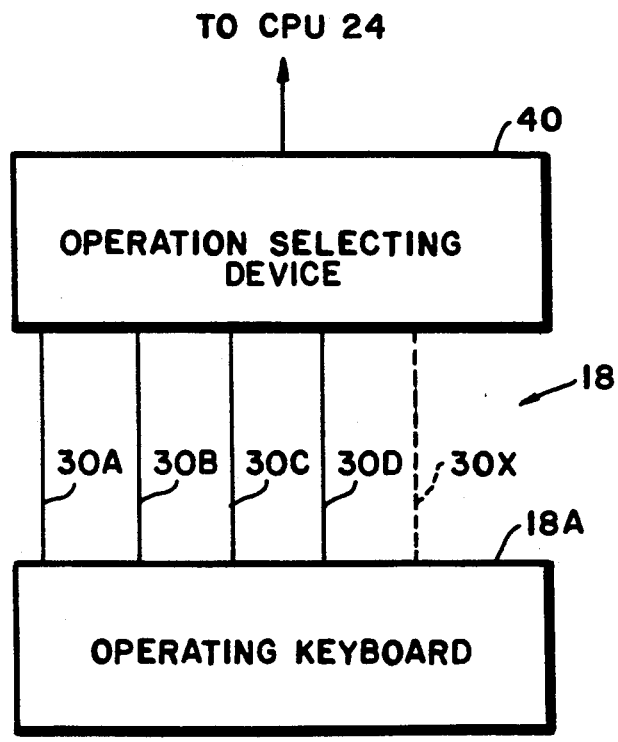
FIG. 3A is a schematic block diagram which depicts the interrelationship between the operating keyboard and operation selecting means, which can be included as part of the CPU.
Figure 3B:
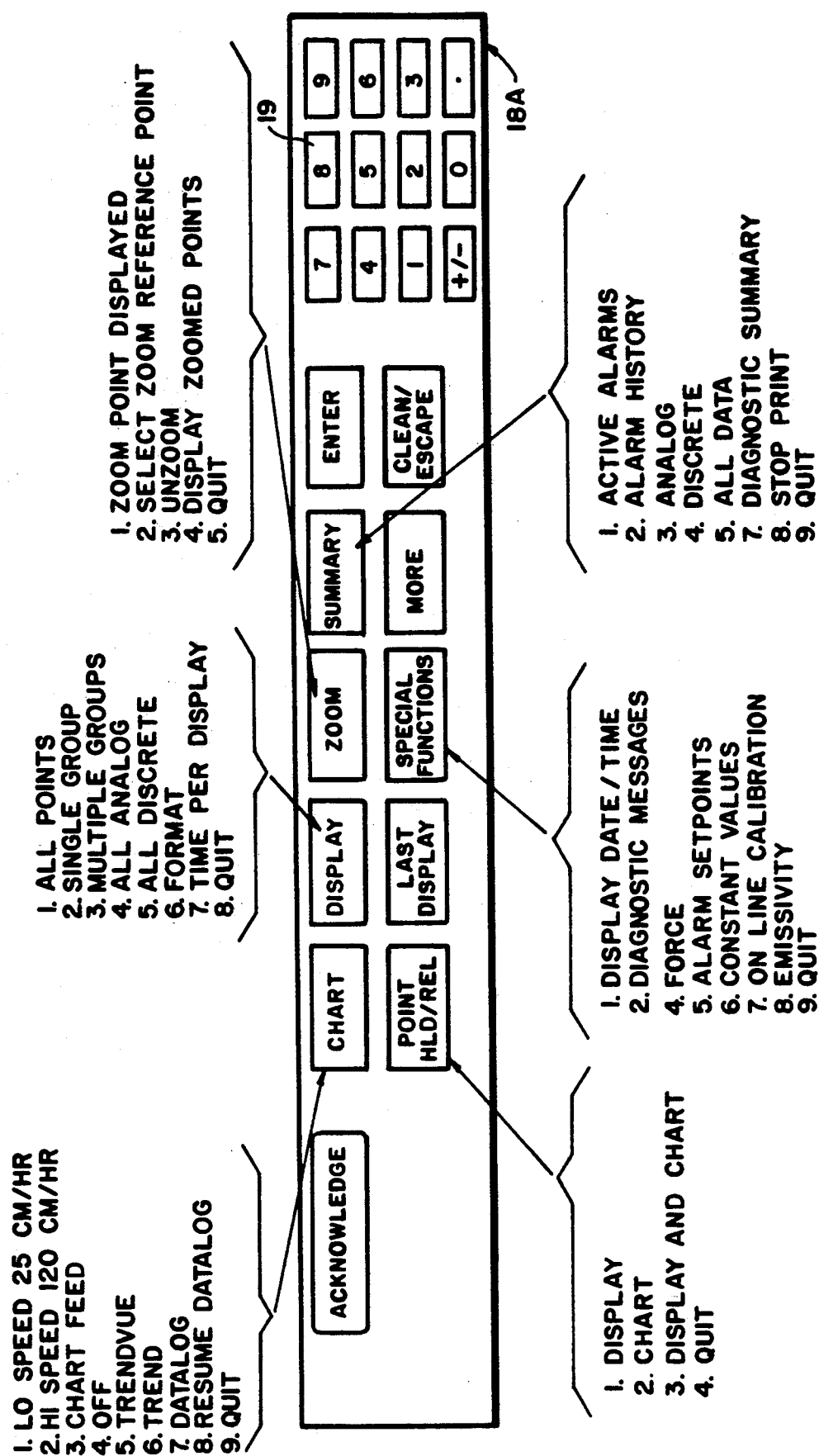
FIG. 3B is an expanded view of the operating keyboard.

The zoom feature expands a chosen portion of the scale appearing on the chart device 12 to full chart width. More significantly, it magnifies the scale which appears on the display 16. The zoom key will permit a similar variety of menu selection, as seen in FIG. 3, and as was discussed before in connection with the description of the DISPLAY key operation.

The SUMMARY key to the right of the ZOOM key is used to print various types of summaries on the full width of the chart. These printouts will interrupt trending, data logging, or other functions in process and return those functions automatically when the summary printouts are complete. This action is effected again by one of the control lines 30A-36 and by means of the encoding means 40 to the CPU 24. Moreover, menu selections are likewise available that can be made operable by activation of the numeral keys on the operating keyboard 18A.

The ENTER key to the right of the SUMMARY key is used to execute selections and to enter values. The ENTER key must be pressed to enter each numerical value in response to a prompt, such as, for example, ENTER AI.

The ACKNOWLEDGE key, to the far upper left on the operating keyboard, is used to acknowledge and display alarms and diagnostic messages, whereas the POINT HHLD/REL key immediately below the CHART key allows the operator to isolate one data point for continuous monitoring either on the display alone, the chart alone, or on both simultaneously. Menu selections are also available and are made operable by use of the numeral keys.

Of particular interest is the fact that the selection of a particular menu, namely display for a given parameter, enables one to review one data point on the dot matrix display only and not on the chart, such that operation of the chart is totally unaffected. As has been pointed out earlier, this is a major feature of the present invention. Alternatively, by means of another menu selection, that is, by pressing the numeral key 2, chart only is selected. That is, the single point data will be presented on the chart only. Another selection may be made, namely display and chart, which will present data for a single point on both the chart and the display.

Thus it will be appreciated that a great selectivity and flexibility is presented by the features of the present invention.

The key designated LAST DISPLAY enables switching between two displays repeatedly. The LAST DISPLAY key is depressed to change the display to whatever was the previous on-line display. The term "on-line" refers to the RUN or OPERATING MODE, as contrasted with VIEW or PROGRAMMING MODE, the latter term sometimes being called "off-line". This LAST DISPLAY key is active in the run mode only.

The SPECIAL FUNCTIONS key to the right of the LAST DISPLAY key allows the operator to review or to make on-line changes to parameters and functions. The SPECIAL FUNCTIONS key, when pressed, also allows menu selections by means of the numeral keys, as indicated. These special functions will be noted at a later point in the specification.

The MORE key is only active when the prompt "MORE" appears on the display, indicating that there is more data than can be fitted on the display at one time. Accordingly, one depresses the MORE key to review such data.

The CLEAR/ESCAPE key has two functions. The clear function will allow an incorrectly keyed numerical value to be deleted so that the correct entry can then be made. When numerical entry is not the current activity, this key's escape function is active. One presses CLEAR/ESCAPE to change the display from the current menu level to the previous (higher) menu level.

The numerical keypad 19, as has already been indicated, is used to select numbered menu items indicated on the display during operation, but it may also be used to enter numerical values when the prompt to ENTER NUMBER appears.

Referring now to FIG. 4, there is indicated a similar scheme to that shown in FIG. 3. However, in FIG. 4, instead of the operating keyboard 18A, what is seen is the programming keyboard 18B which has a totally different purpose. It will be noted at the outset that rather than the particular keyboard shown, other keyboards such as the IBM AT, already known, may be substituted for this keyboard 18B in a receptacle on recorder 10. A full description of the purposes to be accomplished by the keyboard 18B are presented hereinafter, but at this point it is well to note that, similarly to the operating keyboard 18A, there is provided a series of connections 50A-50X to a suitably included encoding device, as part of the keyboard apparatus, for transmitting appropriate coded signals to the CPU for storing the particular programs therein to accomplish the operational objectives of the user. Otherwise, factory installed programming governs the possible operators.

PROGRAMMING (CONFIGURING DATA POINTS)

The first step in programming the recorder of the present invention is to configure the individual data points. This procedure involves keying in information about each point that the recorder 10 will retain in memory and use in subsequent operations. For example, a thermal couple in the process involved may be wired to input 5 in the first card slot of the recorder. The recorder recognizes the presence of the input as data point number AI5, but has no useful information about it until one configures or "programs" it.

In order to accomplish the desired purpose, one uses the programming keyboard 18B and the display 16 to "call up" data point AI5 (it being understood that "A" stands for analog, and "I" for input) and key in certain information about it. Other symbols are DI for discrete input, AO for analog output, PP for pseudo point (calculated value), CN for numerical constant, DO for discrete output, and PD for pseudo point with a discrete output. What is keyed in is a description for the point so the operator can easily identify the point on the display. It might be called "inlet temp. 1", for example.

It may also be desirable to specify a unit of measure to the input, DEG C, for example. One specifies the type of thermocouple it is, to define its range, and one defines the chart scale wanted when a trend chart of this point is printed. Once one is finished entering this information about the point, the point is configured permanently. It is not necessary to do it again unless there is a need to change it. Since the memory is non-volatile, the information will be retained in the recorder even if power is interrupted.

Having configured point AI5, the operator can now use the operating keyboard 18A of FIG. 3, either to print a trend chart of AI5, or read its current value on the display 16, or display its value in a variety of formats. For example, now that the recorder has the information entered, it will display:

AI5 INLET TEMP 1 250 DEG C

It will therefore be appreciated that keying in programming data is a simple menu-driven procedure, with prompts appearing on the display at each step, describing in simple English phrases what to do next.

Detailed procedures for configuring all types of data points cannot be described here. However, as an exemplary procedure for configuring one type of data point, the following is provided.

There is reproduced below a display involved with configuring a particular entry. I/0 is selected and the Enter key on the programming keyboard 18B is depressed. Then AI is selected and the Enter key is again depressed to produce the following:

```
AI  DESCRIPTION  TAG  LEFT RIGHT UNITS TYPE  T'S CL F C
[1]01 SOAK TEMP  TMP-101  0   2500    DEF F TYP R  F A BK U D

←  →  ENTER ESCAPE PG UP PG DN COPY SAVE REMOVE
AI NUMBER                                                    PROG
```

The AI designation will be highlighted, it being assigned by the recorder 10 according to AI cards that have been installed and cannot be changed. Now the PGDN key is used to advance to the next higher number, and the PGUP key is used to obtain the next lower number. In order to access a "distant" point, press Enter, then key in the new point number and press Enter again. The new point will be displayed.

In accordance with well-known cursor operating principles, the cursor is moved to highlight the space under DESCRIPTION. The ENTER key is now pressed so as to edit. The desired descriptor (maximum 14 characters) is keyed in, it being recalled that a descriptor is a term such as "boiler" that will be seen subsequently in an exemplary display. The ENTER key is again pressed. To revise the entry, it is highlighted, the ENTER key is then pressed, and the changes are keyed in. It will be understood that characters can be changed individually and that the DEL key (FIG. 4) is used to erase characters.

scale limit of the chart for this analog input (the value should be in terms of the units of measure to be used—units will be specified in the next step). Press ENTER. To change the entry, highlight it, press ENTER and key in the entry all over again. Cursor to highlight the space under RIGHT and repeat the process to enter a value for the right side limit of the chart.

Cursor to highlight the space under UNITS and press ENTER to edit. Key in a text label (up to 6 characters) to identify units of measure on charts and displays. Press ENTER.

Cursor to the space under TYPE and press ENTER to edit. The display will show:

```
AI 001 TYPE ENTRY: [M]ORE TYPE B TYPE E TYPE J TYPE K TYPE N
TYPE R TYPE S TYPE T W5-W26 PLAT II CU10 PT 100 PT 1K

→ ←  ↑↓  ENTER ESC
PRESS ENTER FOR MORE TYPES.                                 * PROG
```

This is the first of several displays which offer selections to be made as to the type of analog input for this particular data point. The presence of additional displays is indicated by the first selection in the display, which is MORE. To view the additional selections on the next display, cursor to highlight MORE and press ENTER. Repeat to see these additional displays:

```
AI 001 TYPE ENTRY: [M]ORE EMF V EMF MV PULSE POS PULSE NEG
0-3302 0-0073 0-0074 0-0035 0-0412 0-01729 0-0643 0-0216

→ ←  ↑↓  ENTER ESC
PRESS ENTER FOR MORE TYPES.                                   PROG

AI 001 TYPE ENTRY: [M]ORE 0-5423 0-0163 9-8814 4-9014 4-0579
18885 18886 18885-1 18885-2 18886-1 070701 070705 070703

→ ←  ↑↓  ENTER ESC
PRESS ENTER FOR MORE TYPES.                                   PROG

AI 001 TYPE ENTRY: MORE [7]4-0578 75-0579

→ ←  ↑↓  ENTER ESC
RAYOTUBE 18874-0578                                           PROG
```

The next step of programming, in connection with the exemplary analog input AI, is to move the cursor to the space under TAG and press ENTER to edit. Key in the desired point tag, and press ENTER. To revise the entry, highlight it and key in the changes. Press ENTER.

Cursor to highlight the space under LEFT and press ENTER to edit. Key in a numerical value for the left To view a previous display, cursor to MORE and press ENTER. When the desired AI type is highlighted, press ENTER to select it. The display will return to the first AI display with the next selection, "T" (temperature) highlighted.

With the space under T (temperature) highlighted, press ENTER to edit. The display will show:

```
AI DESCRIPTION TAG LEFT RIGHT UNITS TYPE T S CL F C
101 SOAK TEMP TMP-101 0 2500 DEG F TYP R [F]A BK U D
```

←  → ENTER ESC SAVE
SELECT: FARENHEIT CELSIUS RANKINE KELVIN NONE   PROG

If the AI is a temperature type of input, cursor to select the scale to be used and press ENTER. If the AI is not T/C, RTD, or Rayotube, cursor to NONE and press ENTER.

Cursor to the "S" (skip) column and press ENTER to edit. Then cursor to select SKIP or ACTIVE and press ENTER. This selection enables or disables the SKIP function. Selecting SKIP will cause this point to be omitted from charts, on-line displays and alarm levels. Pseudo points or analog outputs using a point in SKIP will continue with a value of zero for the skipped point. Select ACTIVE to permit normal use of the data point. The display will show A for ACTIVE or S for SKIP.

Cursor to the "CL" (color) column and press ENTER to edit. This is the color selection for printing of this point on charts. Cursor to the desired color (BLK, BLU, GRN, or RED) and press ENTER.

Cursor to the "F" (failsafe) column and press ENTER to edit. This is the selection for chart printing action in the event of thermocouple signal loss for this point. Cursor to the desired failsafe action and press ENTER. The choices are: Full upscale action on open input, full downscale on open input, or NONE (no failsafe action on open input).

Cursor to the "C" (circuit type) column and press ENTER to edit. The display will show:

AI DESCRIPTION TAG LEFT RIGHT UNITS TYPE T S CL F C

101 SOAK TEMP TMP-101 0 2500 DEG F TYP R F A BK 7 [D]

←  → ENTER ESCAPE PG UP PG DN COPY SAVE REMOVE
SELECT: INDIRECT DIRECT                        PROG

The DIRECT/INDIRECT selection is for direct or indirect specification of electrical values for the range. If DIRECT is selected for TC or RTD, the recorder 10 will use electrical limits selected from linearization tables. If DIRECT is selected for a voltage or millivoltage range, the range will be in electrical units. If INDIRECT is selected, then actual electrical range values for lower and upper limits must be entered (see following instructions. The values must be within the electrical limits of the actual input card installed. For example, 4-20 mA transmitter inputs are converted to engineering units by using a "volts" range, entering electrical range limits of 1 to 5 volts (250 ohm resistor shunt assumed across input terminals), and entering the proper low/high limits. Pulse inputs also use the INDIRECT selection.

If the AI is direct, select DIRECT and press ENTER. This completes the programming of this AI point. Press the SAVE key. If the AI is indirect, select INDIRECT and press ENTER. The display will show:

AI DESCRIPTION TAG LOCKT HICKT UNITS

-continued

101 SOAK TEMP TMP-101 [0]      20       MV

←  → ENTER ESC SAVE
LOW CIRCUIT VALUE                              PROG

Cursor to the "LOCKT" (Low Circuit Value) column and press ENTER to edit. Key in the low numerical value for the range and press ENTER. Cursor to the "HICKT" (High Circuit Value) column and enter the high value in the same way. Cursor to the "UNITS" column and press ENTER to edit. The display will show:

AI DESCRIPTION TAG LOCKT HICKT UNITS

101 SOAK TEMP TMP-101 0        20     [MV]

←  → ENTER ESC SAVE
SELECT: (MV) V PULSE POSITIVE PULSE NEGATIVE     PROG

Cursor to the desired units of measure and press ENTER. This completes the programming of this ANALOG Input. Press the SAVE key to save the configuration of this point in the recorder memory.

OPERATION

The fundamental operations of the recorder system of the present invention will be appreciated to some extent from the previous sections of this specification, namely the general description and configuring or programming sections.

It is, however, important to understand the full operation of the display 16, which is the primary interface between the recorder and its operator and programmer. The display is used in conjunction with the operator's keyboard 18A, as has been briefly described, to select chart parameters, select what is to be printed, and select how it is to be printed. While the chart is in operation, the display will present various other data selected by the operator. Operation of the display and the chart are, as has been noted, completely independent of each other.

As has also been indicated before, the display 16, seen in FIG. 1, presents simple step-by-step menu selections for programming. The display 16 is a gas plasma dot matrix type, 40 pixels (dots) high by 384 pixels wide. The display format is arranged to show 4 horizontal lines of 5 by 7 pixel characters. When displaying single point A then, two lines are combined to present a double size (10 by 14) character for increased visibility from a distance.

Figure 5A:
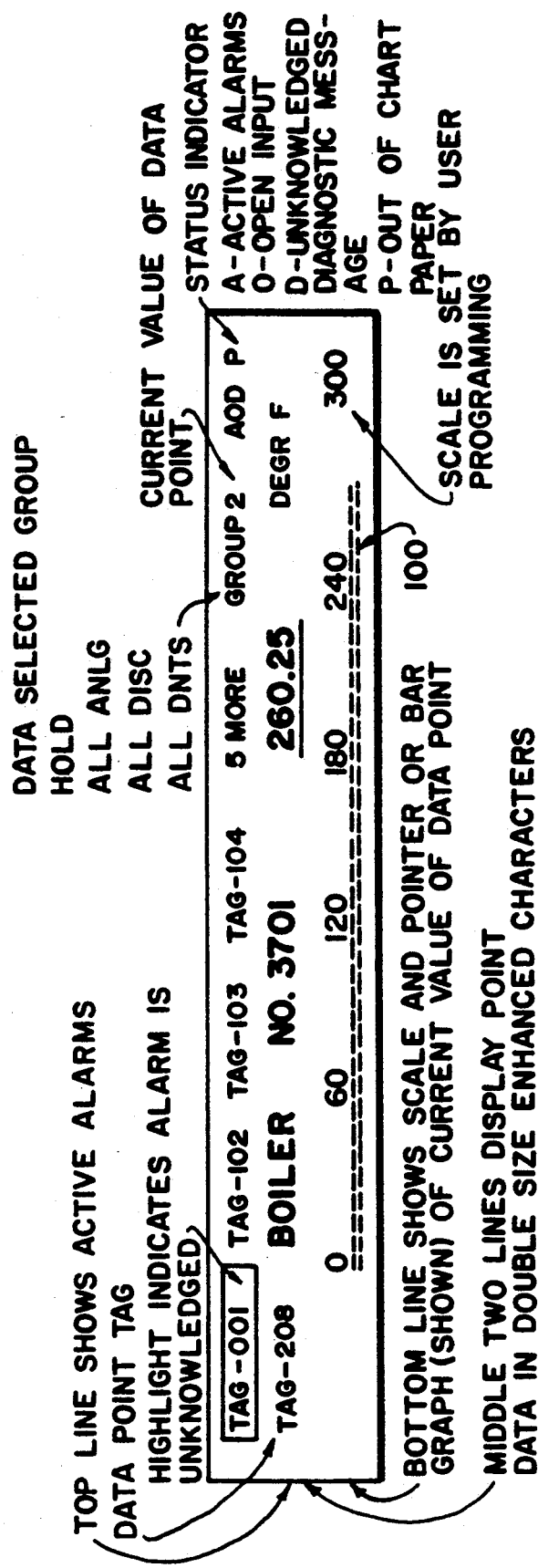
FIG. 5A depicts a typical single point data display which identifies the current value of the given data point and provides other useful information; it also illustrates the several formats available for display presentations.

FIG. 5A illustrates, at an operational stage, the display of an analog group of data, it being recalled that data can be in analog or discrete form. The top line of the illustrated display shows active alarms, these being particularly indicated by the letter A at the upper right of this display, the other letters standing for that which is indicated on this figure. The notation MORE seen near the upper middle part of the display indicates that there are more alarms than will fit on the display. As already noted, the MORE key on the operator's keyboard will cause the display of additional alarms.

A special feature of the recorder 10 is the accompanying scale below the digital data display, the scale being capable of being set by user programming. The scale may be provided in the form of a bar graph 100, as shown, to illustrate the present value of the selected data point. Moreover, a pointer over the bar scale can indicate the current value of a particular item.

As will be made clear hereinafter, some display formats also include an arrow symbol to indicate the rate of change of a data point value being displayed. The rate of change indicator value is PRESENT CHANGE IN ENGINEERING UNITS PER MINUTE. The arrow indications are as follows: arrow pointing up, value increasing rapidly (greater than or equal to 20% of F.S.); arrow pointing to about 1:30 on a clock, value increasing moderately; arrow pointing to 3 on a clock, value changing less than ±10%; arrow pointing down to 4:30, value decreasing moderately (equal to or greater than −10% of FS); arrow pointing down, value decreasing rapidly (equal to or greater than −20% of FS).

Display Operating Procedures

As will be appreciated, the display 16 may be used to view data in a number of formats without any influence on chart activities which are occurring simultaneously.

Of particular significance are the procedures of selecting a display format, and these will be described herewith. Also to be described is the specifying of data to be displayed, as well as instructions and suggestions for use of special features which will make displays more useful.

Display Format

Data may be displayed a single point at a time or several points at a time. Moreover, multiple points or groups of points may be displayed sequentially, with each point, or several points, displayed for a short period of time and then followed by the next. These items are set as follows: first the DISPLAY key on the operating keyboard 18A of FIG. 3 is depressed. By reason of the suitable connections 30A–30X, the display will show the following:

SELECT DISPLAY
1-ALL POINTS 2-SINGLE GROUPS 3-MULTIPLE GROUPS 4-ALL ANALOG.
5-ALL DISCRETE 6-FORMAT 7-TIME PER DISPLAY 8-QUIT

Now when one wants to select a particular format, all that needs to be done is that the number 6 key be depressed. Accordingly, the display 16 will then show:

SELECT DISPLAY FORMAT
0-SML. PTR. DESC. ALM 1-NARROW BAR DESC. ALM 2-LRG. PTR DESC.
3-WIDE BAR DESC. 4-SML. PTR. PT/TAG ALM 5-NAR. BAR PT/TAG ALM
6-LAR. PTR PT/TAG 7-WIDE BAR PT/TAG 8-MULTIPOINT 9-QUIT

For selecting, from the total of 9 formats available, the particular formats illustrated in FIGS. 5B–5E, particular numeral keys 0–8 are depressed. Thus, to realize the presentation on display 16 of FIG. 5B, the format 1 key is depressed so that what one obtains is the scale with a narrow bar 100 previously illustrated. Similarly, if the number 2 key is depressed, the result is the presentation shown in FIG. 5C, that is, format 2 with a large pointer on the scale showing the value at the given moment.

Likewise, format 7 (FIG. 5D) is achieved by depressing key 7, which gives a single point tag ID or number ID plus a scale with a large bar graph and a rate indicator.

To obtain the most significant format available, namely format 8, the corresponding numeral key 8, i.e., multipoint, is depressed and this produces, for a given moment in time, 15 points (out of the total of 135) which are displayed simultaneously, and including tag or point number ID.

Accordingly, it will be understood that nine different formats for the display presentations can be selected, although only four of these have been specifically illustrated.

In order to enable the man skilled in the art to appreciate thoroughly the concepts and principles of the present invention, as well as their implementation, reproduced herewith is selected "printout" of exemplary commands (in source code) utilized in the operation of the present invention. Such commands relate specifically to calling up particular displays in the operating mode of the recorder. It will be understood of course that a large variety of similar commands are utilizable in accordance with the present invention. However, these have not been reproduced herewith because of the need to limit the specification to a reasonable size.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

EXEMPLARY COMMANDS IN CONNECTION WITH DISPLY OPERATION get_next.c

```c
#include "disp_def.h"
include "mmi_def.h"
#include "rec_def.h"
#include "pp_def.h"
#include "lpu_def.h"
#include "stdtype.h"
#include "struct_def.h"
#ifdef   MMIREAL
#include "key_def.h"
endif /****************************************
**** NAME : get_next.c
**** DIR : /r/rec/opermmi/s.get_next.c
**** ORIG : 07-25-88
**** REV : 10.1  1/2/89  13:45:06
**** WHO : slt
**** DATE : 07-25-88
*****************************************************************
****
**** DESCRIPTION :  Go to the next page of the display.
****
**** INPUT : Args: configuration type
****               cursor control data
****
**** OUTPUT:  Next page of the display is shown.
****
****
****    EXECUTION TIME (uSEC) :           OBJ CODE BYTES :
*****************************************************************
*/ void get_next_screen(config_type, cursect1)
    UBYTE                       config_type;
    struct cursor_control_data  *cursect1;

{ extern DI_DB                   dis_in[];
extern DO_DB                   dis_out[];
extern AI_DB                   analog_input[];
#ifndef MMIREAL
extern struct alarm_level_data  alarm_test[];
#else
extern struct alarm_level_data  alarm[];
endif extern void                    refresh_display();
extern void                    find_value();
extern void                    do_vertical_cursor();

DYNFD                       *DFDPTR;
   AI_DB                       *AI;
   struct alarm_level_data     *AL;
   unsigned int                number_of_value;
   UBYTE                       start_value_type;
   UBYTE                       type;
   int                         ai_max;
   int                         al_max;
   int                         di_max;
   int                         do_max;
   int                         start_value_addr;
   int                         address;
   int                         start_value_not_found;
```

```
    DFDPTR = cursect1->dfdstart;
    AI     = analog_input;
#ifndef MMIREAL
{
    AL     = alarm_test;
    ai_max = 10;
    al_max = 20;
    di_max = do_max = 20;
}
else
{
    AL     = alarm;
    ai_max = AI_MAX;
    al_max = ALARM_LEVEL_MAX;
    di_max = DI_MAX;
    do_max = DO_MAX;
}
endif if ( config_type == FORCE_KEY_DATA )
    {
        if ( DFDPTR[ DFD_FORCE_PT_6 ].un.addr == 0x00 )
        /* there are less than "6" live DI/DO's in the Recorder */
            return;
        type                 = DFDPTR[ DFD_FORCE_PT_6 ].comm_type;
        address              = DFDPTR[ DFD_FORCE_PT_6 ].un.u_int;
        start_value_not_found = 1;
        while ( start_value_not_found )
            {
                if ( address == di_max )
                {
                    address = 1;
                    switch ( type )
                        {
                            case 0x21:  type = DO_TYPE;   break;
                            case 0x23:  type = DI_TYPE;   break;
                        }
                }
                else
                    ++address;
                if ( type == DI_TYPE )
                    {
                        if ( dis_in[ address ].remote_status == LOCAL )
                            {
                                start_value_addr     = address;
                                start_value_type     = type;
                                start_value_not_found = 0;
                            }
                    }
                else  /* type == DO_TYPE */
                    {
                        if ( dis_out[ address ].remote_status == LOCAL )
                            {
                                start_value_addr     = address;
                                start_value_type     = type;
                                start_value_not_found = 0;
                            }
                    }
            } /* end while ( start_value_not_found ) */
        find_value( FORCE_KEY_DATA, cursect1, start_value_type, start_value_addr );
    } /* end if ( config_type == FORCE_KEY_DATA ) */ if ( config_type == ALARM_SETPT_DATA )
    {
        if ( DFDPTR[ DFD_SETPT_12 ].un.addr == 0x00 )
        /* there are less than "12" live AL's in the Recorder */
            return;
        start_value_type     = ALM_LEVEL;
        address              = DFDPTR[ DFD_SETPT_12 ].un.u_int;
        start_value_not_found = 1;
        while ( start_value_not_found )
            {
                if ( address == al_max )
                    address = 1;
```

```
                    else
                         ++address;
                    if ( AL[ address ].alarm_action != NOT_USED_C )
                       {
                          start_value_addr      = address;
                          start_value_not_found = 0;
                       }
                  } /* end while ( start_value_not_found ) */
             find_value( ALARM_SETPT_DATA, cursect1, start_value_type, start_value_addr );
          } /* end if ( config_type == ALARM_SETPT_DATA ) */ if ( config_type == CONSTANT_VALUE )
          {
             number_of_value  = CN_NUMBER_OF_VALUE;
             start_value_type = CN_TYPE;
             start_value_addr = DFDPTR[ DFD_CONST_PT_1 ].un.u_int + number_of_value;
             if ( start_value_addr > CN_MAX )
                 start_value_addr -= CN_MAX;
             find_value(CONSTANT_VALUE, cursect1, start_value_type, start_value_addr);
          } /* end if ( config_type == CONSTANT_VALUE ) */ if (( config_type == ONLINE_CAL_DATA ) || (config_type == EMISSIVITY_DATA ))
          {
             if ( DFDPTR[ DFD_BIAS_PT_6 ].un.addr == 0x00 )
                    /* there are less than "6" live AI's in the Recorder */
                    return;
             start_value_type      = AI_TYPE;
             address               = DFDPTR[ DFD_BIAS_PT_6 ].un.u_int;
             start_value_not_found = 1;
             while ( start_value_not_found )
                   {
                      if ( address == ai_max )
                          address = 1;
                      else
                          ++address;
                      if (( AI[ address ].remote_status == DIRECT   ) ||
                          ( AI[ address ].remote_status == INDIRECT ))
                         {
                             if (( config_type == ONLINE_CAL_DATA ) &&
                                 (( AI[ address ].status2 & EMISC_COMP_FLAG ) == 0 ))
                                {
                                   start_value_addr      = address;
                                   start_value_not_found = 0;
                                }
                             else if (( config_type == EMISSIVITY_DATA ) &&
                                      (( AI[ address ].status2 & EMISC_COMP_FLAG ) == EMISC_COMP_
; ))
                                {
                                   start_value_addr      = address;
                                   start_value_not_found = 0;
                                }
                          } /* end if ( remote_status == DIRECT or INDIRECT ) */

} /* end while ( start_value_not_found ) */
             if ( config_type == ONLINE_CAL_DATA )
                 find_value( ONLINE_CAL_DATA, cursect1, start_value_type, start_value_addr );
             else
                 find_value( EMISSIVITY_DATA, cursect1, start_value_type, start_value_addr );
          } /* end if ( config_type == ONLINE_CAL_DATA or EMISSIVITY ) */ return;

} /* end function 'get_next_screen()' */ last_disp.c include "disp_def.h"
include "mmi_def.h"
#include "rec_def.h"
#include "stdtype.h"
#include "struct_def.h"
```

```
#include "onl_def.h"
#ifdef   MMIREAL
#include "key_def.h"
endif

/******************************************
**** NAME : last_disp.c
****  DIR : /r/rec/opermmi/s.last_disp.c
**** ORIG : 09-22-88
****  REV : 10.2  2/7/89  10:29:27
****  WHO : slt
**** DATE : 09-22-88
**********************************************************************
****
**** DESCRIPTION :  Go to the last display.
****
**** INPUT :  Args: online display data
****
**** OUTPUT:  Go to the last display if last display is valid.
****
****    EXECUTION TIME (uSEC) :          OBJ CODE BYTES :
**********************************************************************
*/ void last_display()

{ ifndef MMIREAL
extern DISPHD                     dopsim;
#endif
extern DYNLD                      mainlist;
extern DYNFD                      maindfd[];
extern struct cursor_control_data maincursor;

extern ONLINE                     *online_display;
extern ONLINE                     run_mode_data[2];
extern ONLINE                     point_hold_data;

extern unsigned short int         main_disp_buffer[];
extern void                       build_node();
extern void                       refresh_display();

DYNLD                          *DYNPTR;
   struct cursor_control_data     *cursect1;
   ONLINE                         *tempptr;
   unsigned short int             *BUFPTR;
   int                            group_list_empty;
   int                            i;

/**********************************************************************
Perform basic health checks on the online display structures.
**********************************************************************/ if (( online_display != &run_mode_data[0] ) &&
       ( online_display != &run_mode_data[1] ) &&
       ( online_display != &point_hold_data   ))
       {
          /* try to repair the damage */
          online_display = &run_mode_data[0];
          run_mode_data[0].last_display = &run_mode_data[1];
          run_mode_data[1].last_display = &run_mode_data[0];
           /* set display for ALL points */
          online_display->option_flag = ALLPOINTS_ALL;
          online_display->display_format = 1;
          online_display->scale_format = 1;
          online_display->update_freq = 0;     /* once per second */
          online_display->update_counter = 0;  /* starting now !! */
          online_display->group_list_index = 0;
          online_display->point_list_index = 0;
          online_display->next_point_index = 0;
          online_display->next_all_point_index = 1;
```

```
            goto RETURN;
        } /* end if */ if( online_display == &point_hold_data )
        return;   /* don't allow casual escape from Pt Hold mode */

/* force the last display pointers into their proper alignment */
    run_mode_data[0].last_display = &run_mode_data[1];
    run_mode_data[1].last_display = &run_mode_data[0];

tempptr = online_display->last_display;

if (( tempptr->option_flag & ALL_POINTS ) == 0 )
        {
            i = 1;
            group_list_empty = 1;
            while (( i <= GROUP_MAX ) && group_list_empty )
                {
                    if ( tempptr->group_list[i] != 0 )
                        group_list_empty = 0;
                    ++i;
                }
            if ( group_list_empty )
                goto RETURN;
        } /* end if */ if( tempptr->update_freq > MAX_DISP_SEQ_TIME )
            goto RETURN;

if ( tempptr->display_format == 0 )
            goto RETURN;

/* if online display structure is valid, initialize routine stuff */ tempptr->group_list_index = 1;
    tempptr->point_list_index = 0;
    tempptr->next_point_index = 0;
    tempptr->next_all_point_index = 1;
    tempptr->update_counter    = 0;

online_display = tempptr;

RETURN:

#ifndef MMIREAL
    /* build return display */
    /* connect dfd and dyn_list_data structures */
    mainlist.dfd = maindfd;

/* set pointers to mmi structures */

DYNPTR   = &mainlist;
    BUFPTR   = main_disp_buffer;
    cursect1 = &maincursor;
    build_node( &dopsim, cursect1, DYNPTR, BUFPTR );
    refresh_display( cursect1 );
#else
    return;
endif } /* end function 'last_display()' */ get_value.c include "disp_def.h"
include "mmi_def.h"
#include "pp_def.h"
#include "struct_def.h"
```

```
#ifdef   MMIREAL
#include "key_def.h"
endif

/****************************************
**** NAME : get_value.c
****  DIR : /r/rec/opermmi/s.get_value.c
**** ORIG : 07-19-88
****  REV : 10.1  1/2/89  13:45:55
****  WHO : slt
**** DATE : 07-19-88
*************************************************************************
****
**** DESCRIPTION :  Get value entered on the display.
****
**** INPUT : Args: cursor control data
****
**** OUTPUT: cursor control data
****
****    EXECUTION TIME (uSEC) :           OBJ CODE BYTES :
*************************************************************************
*/ void get_data_value( cursect1 )
     struct cursor_control_data  *cursect1;
{ extern int                 wait_for_key();
extern int                 execute_key();
extern void                build_node();
extern void                build_disp();
extern void                refresh_display();
extern void                do_left_cursor();
extern void                do_enter();

short int              temp_index;
    int                    escape_flag;
    int                    key;

/* open field for editing */ do_enter( cursect1 );

key = 0;

while (( key != ENTER_KEY ) && ( key != ESCAPE_KEY ))
        {
           key = wait_for_key( cursect1->current_keylist );
           execute_key( (UBYTE) key, cursect1 );
        } if ( key == ENTER_KEY )
       {
          temp_index = cursect1->listptr->dlist_index;
          if (( cursect1->dfdstart[ temp_index ].comm_type == 0xfb    ) ||
              ( cursect1->dfdstart[ temp_index ].comm_type == 0xfc    ) ||
              ( cursect1->dfdstart[ temp_index ].comm_type == DI_TYPE ) ||
              ( cursect1->dfdstart[ temp_index ].comm_type == DO_TYPE ) ||
              ( cursect1->dfdstart[ temp_index ].comm_type == AI_TYPE ) ||
              ( cursect1->dfdstart[ temp_index ].comm_type == AO_TYPE ) ||
              ( cursect1->dfdstart[ temp_index ].comm_type == CN_TYPE ) ||
              ( cursect1->dfdstart[ temp_index ].comm_type == PP_TYPE ))
             return;
          else
             do_left_cursor( cursect1 );
       } return;

} /* end function 'get_data_value()' */
``` scrol_disp.c

```c
#include "disp_def.h"
include "mmi_def.h"
#include "rec_def.h"
#include "pp_def.h"
#include "lpu_def.h"
#include "stdtype.h"
#include "struct_def.h"
#ifdef   MMIREAL
#include "key_def.h"
endif /*****************************************
**** NAME : scrol_disp.c
**** DIR  : /r/rec/opermmi/s.scrol_disp.c
**** ORIG : 07-22-88
**** REV  : 10.1  1/2/89  14:06:30
**** WHO  : slt
**** DATE : 07-22-88
***********************************************************************
****
**** DESCRIPTION :  Scroll the display one line up or down.
****
**** INPUT : Args:  cursor type ( UP or DOWN )
****                configuration type
****                cursor control data
****
**** OUTPUT:  The display is scrolled up or down one line.
****
****
****    EXECUTION TIME (uSEC) :            OBJ CODE BYTES :
***********************************************************************
*/ void scroll_display(cursor_type, config_type, cursect1)
     unsigned char              cursor_type;
     unsigned char              config_type;
     struct cursor_control_data *cursect1;

{ extern DI_DB              dis_in[];
     extern DO_DB              dis_out[];
     extern AI_DB              analog_input[];
#ifndef MMIREAL
     extern struct  alarm_level_data  alarm_test[];
#else
     extern struct  alarm_level_data  alarm[];
#endif
     extern void               refresh_display();
     extern void               find_value();
     extern void               do_vertical_cursor();

DYNFD                     *DFDPTR;
     AI_DB                     *AI;
     struct alarm_level_data   *AL;
     unsigned int              number_of_value_per_line;
     unsigned char             start_value_type;
     unsigned char             type;
     int                       ai_max;
     int                       al_max;
     int                       di_max;
     int                       do_max;
     int                       start_value_addr;
     int                       address;
     int                       pass;

DFDPTR = cursect1->dfdstart;
     AI     = analog_input;
```

```
#ifndef MMIREAL
{
    AL     = alarm_test;
    ai_max = 10;
    al_max = 20;
    di_max = do_max = 20;
}
else
{
    AL     = alarm;
    ai_max = AI_MAX;
    al_max = ALARM_LEVEL_MAX;
    di_max = DI_MAX;
    do_max = DO_MAX;
}
endif if ( config_type == FORCE_KEY_DATA )
    {
        if ( DFDPTR[ DFD_FORCE_PT_6 ].un.addr == 0x00 )
        {
            /* there are less than "6" live DI/DO in the Recorder */
            if ( cursor_type == DOWN_CURSOR_KEY )
            {
                /* force cursor stay at left column on line #3 */
                do_vertical_cursor ( (int)UP_CURSOR_KEY, cursect1 );
                do_vertical_cursor ( (int)UP_CURSOR_KEY, cursect1 );
            }
            return;
        }
        type                   = DFDPTR[ DFD_FORCE_PT_1 ].comm_type;
        address                = DFDPTR[ DFD_FORCE_PT_1 ].un.u_int;
        number_of_value_per_line = FC_NUM_VAL_PERLINE;
        pass = 1;
        if ( cursor_type == DOWN_CURSOR_KEY )
        {
            start_value_type = DFDPTR[ DFD_FORCE_PT_3 ].comm_type;
            start_value_addr = DFDPTR[ DFD_FORCE_PT_3 ].un.u_int;
        } /* end if ( cursor_type == DOWN_CURSOR_KEY ) */
        else if ( cursor_type == UP_CURSOR_KEY )
            {
                while ( pass <= number_of_value_per_line )
                {
                    if ( address == 1 )
                    {
                        address = di_max;
                        switch ( type )
                        {
                            case 0x21: type = DO_TYPE; break;
                            case 0x23: type = DI_TYPE; break;
                        }
                    }
                    else
                        --address;
                    if ( type == DI_TYPE )
                    {
                        if ( dis_in[ address ].remote_status == LOCAL )
                        {
                            start_value_addr = address;
                            start_value_type = type;
                            ++pass;
                        }
                    }
                    else  /* type == DO_TYPE */
                    {
                        if ( dis_out[ address ].remote_status == LOCAL )
                        {
                            start_value_addr = address;
                            start_value_type = type;
                            ++pass;
                        }
                    }
                } /* end while ( pass <= number_of_value_per_line ) */
            } /* end if ( cursor_type == UP_CURSOR_KEY ) */
```

```
        else
            return;
        find_value(FORCE_KEY_DATA, cursect1, start_value_type, start_value_addr);
    }  /* end if ( config_type == FORCE_KEY_DATA ) */ if ( config_type == ALARM_SETPT_DATA )
    {
        if ( DFDPTR[ DFD_SETPT_12 ].un.addr == 0x00 )
        {
            /* there are less than "12" live AL's in the Recorder */
            if ( cursor_type == DOWN_CURSOR_KEY )
            {
                /* force cursor stay at left column on line #3 */
                do_vertical_cursor ( (int)UP_CURSOR_KEY, cursect1 );
                do_vertical_cursor ( (int)UP_CURSOR_KEY, cursect1 );
            }
            return;
        }
        start_value_type        = ALM_LEVEL;
        address                 = DFDPTR[ DFD_SETPT_1 ].un.u_int;
        number_of_value_per_line = AL_NUM_VAL_PERLINE;
        pass = 1;
        if ( cursor_type == DOWN_CURSOR_KEY )
            start_value_addr = DFDPTR[ DFD_SETPT_5 ].un.u_int;
        else if ( cursor_type == UP_CURSOR_KEY )
        {
            while ( pass <= number_of_value_per_line )
            {
                if ( address == 1 )
                    address = al_max;
                else
                    --address;
                if ( AL[ address ].alarm_action != NOT_USED_C )
                {
                    start_value_addr = address;
                    ++pass;
                }
            }  /* end while ( pass <= number_of_value_per_line ) */
        }  /* end if ( cursor_type == UP_CURSOR_KEY ) */
        else
            return;
        find_value(ALARM_SETPT_DATA, cursect1, start_value_type, start_value_addr);
    }  /* end if ( config_type == ALARM_SETPT_DATA ) */ if ( config_type == CONSTANT_VALUE )
    {
        number_of_value_per_line = CN_NUM_VAL_PERLINE;
        start_value_type         = CN_TYPE;
        if ( cursor_type == DOWN_CURSOR_KEY )
        {
            start_value_addr = DFDPTR[ DFD_CONST_PT_1 ].un.u_int + number_of_value_per_l if ( start_value_addr > CN_MAX )
                start_value_addr -= CN_MAX;
        }
        else if ( cursor_type == UP_CURSOR_KEY )
        {
            start_value_addr = DFDPTR[ DFD_CONST_PT_1 ].un.u_int - number_of_value_
ine;
            if ( start_value_addr <= 0 )
                start_value_addr += CN_MAX;
        }
        else
            return;
        find_value(CONSTANT_VALUE, cursect1, start_value_type, start_value_addr);
    }  /* end if ( config_type == CONSTANT_VALUE ) */ if (( config_type == ONLINE_CAL_DATA ) || ( config_type == EMISSIVITY_DATA ))
    {
        if ( DFDPTR[ DFD_BIAS_PT_6 ].un.addr == 0x00 )
        {
            /* there are less than "6" live AI in the Recorder */
            if ( cursor_type == DOWN_CURSOR_KEY )
            {
                /* force cursor stay at left column on line #3 */
```

```c
                do_vertical_cursor ( (int)UP_CURSOR_KEY, cursect1 );
                do_vertical_cursor ( (int)UP_CURSOR_KEY, cursect1 );
            }
            return;
        }
        start_value_type       = AI_TYPE;
        address                = DFDPTR[ DFD_BIAS_PT_1 ].un.u_int;
        number_of_value_per_line = BI_NUM_VAL_PERLINE;
        pass = 1;
        if ( cursor_type == DOWN_CURSOR_KEY )
            start_value_addr = DFDPTR[ DFD_BIAS_PT_3 ].un.u_int;
        else if ( cursor_type == UP_CURSOR_KEY )
            {
                while ( pass <= number_of_value_per_line )
                    {
                        if ( address == 1 )
                            address = ai_max;
                        else
                            --address;
                        if (( AI[ address ].remote_status == DIRECT   ) ||
                            ( AI[ address ].remote_status == INDIRECT ))
                        {
                            if (( config_type == ONLINE_CAL_DATA ) &&
                                (( AI[ address ].status2 & EMISC_COMP_FLAG ) == 0 ))
                            {
                                start_value_addr = address;
                                ++pass;
                            } /* end if ( config_type == ONLINE_CAL_DATA ) */
                            else if (( config_type == EMISSIVITY_DATA ) &&
                                    (( AI[ address ].status2 & EMISC_COMP_FLAG) == EMISC_COMP_FLAG ))
                            {
                                start_value_addr = address;
                                ++pass;
                            } /* end if ( config_type == EMISSIVITY_DATA ) */
                        } /* end if ( remote_status == DIRECT or INDIRECT ) */
                    } /* end while ( pass <= number_of_value_per_line ) */
            } /* end if ( cursor_type == UP_CURSOR_KEY ) */
        else
            return;
        if ( config_type == ONLINE_CAL_DATA )
            find_value(ONLINE_CAL_DATA, cursect1, start_value_type, start_value_addr);
        else
            find_value(EMISSIVITY_DATA, cursect1, start_value_type, start_value_addr);
    } /* end if ( config_type == ONLINE_CAL_DATA or EMISSIVITY ) */ return;

} /* end function 'scroll_display()' */ disp_mmi.c include "disp_def.h"
include "mmi_def.h"
#include "rec_def.h"
#include "stdtype.h"
#include "struct_def.h"
#include "onl_def.h"
#define DFD_MMI_ERROR   1
#ifdef   MMIREAL
#include "key_def.h"
endif /****************************************
**** NAME : disp_mmi.c
****  DIR : /r/rec/opermmi/s.disp_mmi.c
**** ORIG : 07-12-88
****  REV : 10.3  2/13/89  11:10:03
****  WHO : slt
**** DATE : 07-12-88
*********************************************************************
```

```
/****
**** DESCRIPTION :  Build the DISPLAY key data display.
****
**** INPUT :  Args: None
****
**** OUTPUT:  Bring up the DISPLAY key display and perform the corresponding
****          DISPLAY functions according to the function key entered.
****
****     EXECUTION TIME (uSEC) :          OBJ CODE BYTES :
*********************************************************************
*/ void display_mmi()
{ extern DISPHD                    d3224, d32242, d32243, d32246, d32247;
    extern DISPHD                    d32226, d3222620;
    #ifndef   MMIREAL
    extern DISPHD                    dopsim;
    #endif
    extern DYNLD                     mainlist;
    extern DYNFD                     maindfd[];
    extern struct cursor_control_data maincursor;

extern ONLINE                    *online_display;
    extern ONLINE                    run_mode_data[];
    extern ONLINE                    point_hold_data;

extern unsigned short int        main_disp_buffer[];
    extern int                       wait_for_key();
    extern void                      build_node();
    extern void                      build_display();
    extern void                      refresh_display();
    extern void                      init_dfd_list();
    extern ULONG                     verify_group_list();
    #define SET_GROUPS_ACTIVE    (~ALL_POINTS)
    #define ALL_POINT_MODE_MASK  (~ALL_POINTS)

DYNLD                         *DYNPTR;
        DYNFD                         *DFDPTR;
        struct cursor_control_data    *cursect1;
        ONLINE                        *tempptr;
        unsigned short int            *BUFPTR;
        int                           escape_flag;
        int                           error_flag;
        int                           key;
        int                           ek_return;
        int                           wait_for_response;
        int                           option_selected;
        int                           i,j;
        UBYTE                         *gpptr;
        UBYTE                         pthold_is_active = 0;  /* 0 = not active */
        UBYTE                         display_format;
        UBYTE                         gp_list[GROUP_MAX + 1];

#ifndef MMIREAL
        if (( online_display != &run_mode_data[0] ) &&
            ( online_display != &run_mode_data[1] ) &&
            ( online_display != &point_hold_data  ))
              online_display = &run_mode_data[0];
    #endif if ( online_display == &point_hold_data )
            pthold_is_active = 1;

/*  connect dfd and dyn_list_data structures  */ mainlist.dfd  =  maindfd;

/*  set pointers to mmi structures  */
```

```
        DYNPTR   = &mainlist;
        DFDPTR   = maindfd;
        BUFPTR   = main_disp_buffer;
        cursect1 = &maincursor;

/* initialize dfd list data */ init_dfd_list( DFDPTR, MAIN_BUFFER_SIZE );

GO_AGAIN:
        /* set up dynamic data list structure */ i = DFD_GROUP_NO_1;

for (j=1;j(=GROUP_MAX;j++)
                DFDPTR[i++].un.u_int  = (unsigned int) online_display->group_list[j];
        DFDPTR[ DFD_CURR_DISP_FORMAT ].un.addr = online_display->display_format;
        DFDPTR[ DFD_TIME_PER_DISP ].un.u_int   = online_display->update_freq + 1;

/* build main selection display */ build_node( &d3224, cursect1, DYNPTR, BUFPTR );
        refresh_display( cursect1 );

/* wait for operator response */ escape_flag      = 1;
        wait_for_response = 0;

while( escape_flag )
        {
            key = wait_for_key( 14 );     /* 0 thru 9 */ option_selected = key;

ERROR_LABEL:

error_flag = 0;
            switch( (UBYTE) key )
            {
                case KEY_1:       /* display ALL POINTS      */
                        if( pthold_is_active)
                        {
                          mmi_error_display(cursect1,OPERR_POINT_HOLD_IS_ACTIVE);
                           goto GO_AGAIN;
                        }
                        escape_flag = 0;
                        break;

case KEY_2:       /* display ONE group       */
                        if( pthold_is_active)
                        {
                          mmi_error_display(cursect1,OPERR_POINT_HOLD_IS_ACTIVE);
                           goto GO_AGAIN;
                        }
                        build_node( &d32242, cursect1, cursect1->dynlist,
                                                cursect1->bufstart );
                        wait_for_response = 1;
                        escape_flag = 0;
                        break;

case KEY_3:       /* display MULTIPLE groups */
                        if( pthold_is_active)
                        {
                          mmi_error_display(cursect1,OPERR_POINT_HOLD_IS_ACTIVE);
                           goto GO_AGAIN;
                        }
                        build_node( &d3222620, cursect1, cursect1->dynlist,
                                                cursect1->bufstart );
                        build_display( &d32243, cursect1->dynlist,
                                                cursect1->bufstart );
                        wait_for_response = 1;
                        escape_flag = 0;
                        break;
```

```
        case KEY_4:       /* All analog */
                if( pthold_is_active)
                {
                  mmi_error_display(cursect1,OPERR_POINT_HOLD_IS_ACTIVE);
                    goto GO_AGAIN;
                  }
                escape_flag = 0;
                break;

case KEY_5:       /* All discrete */
                if( pthold_is_active)
                {
                  mmi_error_display(cursect1,OPERR_POINT_HOLD_IS_ACTIVE);
                    goto GO_AGAIN;
                  }
                escape_flag = 0;
                break;

case KEY_6:       /* choose DISPLAY FORMAT   */
                build_node( &d32246, cursect1, cursect1->dynlist,
                                        cursect1->bufstart );
                refresh_display( cursect1 );
                escape_flag = 0;
                break;

case KEY_7:       /* set TIME PER DISPLAY    */
                if( pthold_is_active)
                {
                  mmi_error_display(cursect1,OPERR_POINT_HOLD_IS_ACTIVE);
                    goto GO_AGAIN;
                  }
                build_node( &d32247, cursect1, cursect1->dynlist,
                                        cursect1->bufstart );
                wait_for_response = 1;
                escape_flag = 0;
                break;

case KEY_8:       /* QUIT this key service routine */
        case ESCAPE_KEY:  /* operator wants to abandon this function */
                goto RETURN;

default:          /* invalid keys */
                break;

} /* end of switch */
    }   /* end while loop */

/* wait if dialogue requires further responses */ if ( wait_for_response )
   {
      key = 0;
      ek_return = 1;    /* force initial update of the display */ while ( cursect1->curr_node != &d32226 )
          {
            if ( ek_return )
                 /* key was NOT echoed directly */
                 refresh_display( cursect1 );
            key = wait_for_key( cursect1->current_keylist );

if (( key == PLUS_MINUS_KEY ) || ( key == POINT_KEY ))
               {
                  cursect1->data_entry_options |= PREVENT_DISPLAY_ADVANCE;
                  ek_return = execute_key( ENTER_KEY, cursect1 );
                  if ( key == POINT_KEY )
                     {
                       cursect1->edit_in_progress = 0;  /* no edit */
                       do_left_cursor( cursect1 );
                       cursect1->edit_in_progress = 0;  /* no edit */
                       do_left_cursor( cursect1 );
                     }
               }
            else
                ek_return = execute_key( (UBYTE) key, cursect1 );
```

```
              } /* end while loop */
     }. /* end 'if wait_for_response' */

/* process entry according to the option selected */ if ( key == ESCAPE_KEY )
     goto GO_AGAIN;

switch( (UBYTE) option_selected )
   {
    case KEY_1:       /* display ALL points */
                /* preserve display set-up */
             tempptr = online_display->last_display;
             *tempptr = *online_display;
             tempptr->group_list_index = 1;
             tempptr->point_list_index = 0;
             tempptr->next_point_index = 0;
             tempptr->next_all_point_index = 1;
             tempptr->update_counter     = 0;
             tempptr->option_flag &= ALL_POINT_MODE_MASK;
             tempptr->option_flag |= ALLPOINTS_ALL;
             online_display = tempptr;
             break;

case KEY_2:       /* display ONE group */
             gp_list[0] = DFDPTR[ DFD_GROUP_NO_1 ].un.u_int;

if((gp_list[0] < 1) || (gp_list[0] > GROUP_MAX))
              {
                DFDPTR[ DFD_GROUP_NO_1 ].field_status |= DFD_MMI_ERROR;
                key = option_selected;
                goto ERROR_LABEL;
              } if( verify_group_list(gp_list, 1) == 0 )
              {
                mmi_error_display( cursect1, OPERR_NO_ACTIVE_POINTS );
                goto GO_AGAIN; /* no active points in list */
              }

/* preserve display set-up */
             tempptr = online_display->last_display;
             *tempptr = *online_display;

/* add new items and re-initialize */
             for (i=1;i<=GROUP_MAX;i++)
                   tempptr->group_list[i] = 0;
             tempptr->group_list[1]   = DFDPTR[ DFD_GROUP_NO_1 ].un.u_int;
             tempptr->group_list_index = 1;
             tempptr->point_list_index = 1;
             tempptr->next_point_index = 0;
             tempptr->update_counter    = 0;
             tempptr->option_flag &= SET_GROUPS_ACTIVE; /* GROUP mode */
             online_display = tempptr;
             break;

case KEY_3:       /* display MULTIPLE GROUPS */
             gpptr = gp_list;
             error_flag = 0;

for (i = DFD_GROUP_NO_1; i <= DFD_GROUP_NO_20; i++)
              {
                *gpptr++ = DFDPTR[i].un.addr;
                if ( DFDPTR[i].un.u_int > GROUP_MAX )
                 {
                   DFDPTR[i].field_status |= DFD_MMI_ERROR;
                   key = option_selected;
                   error_flag = 1;
                 };
              } if ( error_flag )
                 goto ERROR_LABEL;
```

```
            if( verify_group_list(gp_list, GROUP_MAX) == 0 )
            {
              mmi_error_display( cursect1, OPERR_NO_ACTIVE_POINTS );
              goto GO_AGAIN; /* no active points in list */
            }

/* preserve display set-up */
            tempptr = online_display->last_display;
            *tempptr = *online_display;

/* add new items and re-initialize */
            i = DFD_GROUP_NO_1;
            for (j=1;j<=GROUP_MAX;j++)
                 tempptr->group_list[j] = (UBYTE) DFDPTR[i++].un.u_int;
            tempptr->group_list_index = 1;
            tempptr->point_list_index = 1;
            tempptr->next_point_index = 0;
            tempptr->update_counter   = 0;
            tempptr->option_flag &= SET_GROUPS_ACTIVE; /* GROUP mode */
            online_display = tempptr;
            break;

case KEY_4:       /* display ALL analog points */
                /* preserve display set-up */
            tempptr = online_display->last_display;
            *tempptr = *online_display;
            tempptr->group_list_index = 1;
            tempptr->point_list_index = 0;
            tempptr->next_point_index = 0;
            tempptr->next_all_point_index = 1;
            tempptr->update_counter   = 0;
            tempptr->option_flag &= ALL_POINT_MODE_MASK;
            tempptr->option_flag |= ALLPOINTS_ANALOG;
            online_display = tempptr;
            break;

case KEY_5:       /* display ALL discrete points */
                /* preserve display set-up */
            tempptr = online_display->last_display;
            *tempptr = *online_display;
            tempptr->group_list_index = 1;
            tempptr->point_list_index = 0;
            tempptr->next_point_index = 0;
            tempptr->next_all_point_index = 1;
            tempptr->update_counter   = 0;
            tempptr->option_flag &= ALL_POINT_MODE_MASK;
            tempptr->option_flag |= ALLPOINTS_DISCRETE;
            online_display = tempptr;
            break;

case KEY_6:       /* choose DISPLAY FORMAT    */
            key          = 0;
            escape_flag  = 1;
            while ( escape_flag )
                {
                    key = wait_for_key( 14 ); /* 0 thru 9 */
                    switch ( (UBYTE) key )
                    {
                        case KEY_0: display_format = 1;
                                    escape_flag = 0;
                                    break;
                        case KEY_1: display_format = 2;
                                    escape_flag = 0;
                                    break;
                        case KEY_2: display_format = 3;
                                    escape_flag = 0;
                                    break;
                        case KEY_3: display_format = 4;
                                    escape_flag = 0;
                                    break;
                        case KEY_4: display_format = 5;
                                    escape_flag = 0;
                                    break;
                        case KEY_5: display_format = 6;
                                    escape_flag = 0;
                                    break;
```

```
                    case KEY_6: display_format = 7;
                                escape_flag = 0;
                                break;
                    case KEY_7: display_format = 8;
                                escape_flag = 0;
                                break;
                    case KEY_8: display_format = 9;
                                escape_flag = 0;
                                break;
                    case KEY_9: /* QUIT */
                    case ESCAPE_KEY: /* operator wants to abandon
                                            this function */
                                escape_flag = 0;
                                goto RETURN;
                                break;
                    default:
                                break;
                    } /* end switch */
                } /* end while */ if( pthold_is_active )
                {
                    online_display->display_format = display_format;
                    goto RETURN;
                }

/* preserve display set-up */
                tempptr = online_display->last_display;
                *tempptr = *online_display;
                tempptr->display_format = display_format; /* FORMAT */
                tempptr->group_list_index = 1;
                tempptr->point_list_index = 0;
                tempptr->next_point_index = 0;
                tempptr->next_all_point_index = 1;
                tempptr->update_counter    = 0;
                online_display = tempptr;
                break;

case KEY_7:         /* set TIME PER DISPLAY      */
                if (( DFDPTR[ DFD_TIME_PER_DISP ].un.u_int ( MIN_DISP_SEQ_TIME )
                   ||( DFDPTR[ DFD_TIME_PER_DISP ].un.u_int ) MAX_DISP_SEQ_TIME ))
                {
                    DFDPTR[ DFD_TIME_PER_DISP ].field_status |= DFD_MMI_ERROR;
                    key = option_selected;
                    goto ERROR_LABEL;
                }

/* adjust value down by one second */
                online_display->update_freq =
                        DFDPTR[ DFD_TIME_PER_DISP ].un.u_int - 1;
                online_display->update_counter = 0;
                break;

default:
                break;

} /* end of switch */

RETURN:
    /* guarantee that the last display pointers are still in order */
    run_mode_data[0].last_display = &run_mode_data[1];
    run_mode_data[1].last_display = &run_mode_data[0];

#ifndef MMIREAL
{
    /* build return display. */
    build_node( &dopsim, cursect1, DYNPTR, BUFPTR );
    refresh_display( cursect1 );
}
else
    return;
endif } /* end function 'display_mmi()' */
```

We claim:

1. A system for recording and displaying data originating from input/output data points in either analog or discrete from comprising:
   - a chart recorder for recording said data from said input/output data points in printed form;
   - a separate programmable display for presenting current data in graphic form, comprising a display responsive to said input/output data points, said display being operated independently of said chart recorder such that the current data from said input/output data points are displayed discretely on said display whether the same or different data or no data is being printed by said chart recorder;
   - and operating keyboard for independently operating said display and said chart recorder, said keyboard having individual function keys and at least six numeral keys for selectively controlling said display and said chart recorder; and
   - means for selecting a single, discrete presentation of said current data from one input/output point, in graphic form on said display in a variety of formats, said formats including a scale with pointer and a scale with bar graph;
   - said means for selecting including said numeral keys for calling up a particular format by first depressing the numeral key corresponding to format selection and subsequently depressing a numeral key corresponding to a particular formal; and
   - including variable, current configuration for the input/output data points, and means for establishing in one presentation all of said current configuration for said data points.

2. A system as defined in claim 1, in which a display comprises a dot matrix display.

3. A system as defined in claim 1, further including a trend indicator on said display means.

4. A system as defined in claim 1, including means for displaying simultaneously 15 input/output points.

5. A system as defined in claim 1, including a zoom means, and a key on said operating keyboard for controlling said zoom means so as to magnify the data on the chart recorder and on the display.

* * * * *